United States Patent [19]

Tavlarides et al.

[11] 4,294,800

[45] Oct. 13, 1981

[54] LIQUID JET RECYCLE REACTOR

[76] Inventors: Lawrence L. Tavlarides, 940 Sheridan Rd., Wilmette, Ill. 60091; Robert W. Freeman, 1539 S. Wolf Rd., Wheeling, Ill. 60090; Alexander M. Hsia, c/o Illinois Intitute of Technology, 71 E. 32nd St. - Room 110, Chicago, Ill. 60616

[21] Appl. No.: 955,581

[22] Filed: Oct. 30, 1978

[51] Int. Cl.³ .................... G01N 21/00; B01J 14/00
[52] U.S. Cl. .................................. 422/68; 23/230 R; 23/230 M; 422/81; 422/234
[58] Field of Search ............... 422/230, 231, 234, 256, 422/224, 235, 207, 129, 130, 240, 68, 81; 208/48, 48 Q; 261/76

[56] References Cited

U.S. PATENT DOCUMENTS

| 3,523,758 | 8/1970 | Austin et al. | 422/157 |
| 3,786,110 | 1/1974 | Oleszko | 208/48 Q X |
| 4,121,908 | 10/1978 | Raab | 208/48 O |

FOREIGN PATENT DOCUMENTS 321473 5/1929 United Kingdom ............. 208/48 Q

OTHER PUBLICATIONS

Diffusion Through the Liquid–Liquid Interface, AIChE Journal, vol. 10, No. 2, Ward et al.
Kimura et al., Mass transfer in a liquid–liquid laminar jet, Chem. Eng. Sci., 1966, vol. 21, pp. 1057–1065.
Fosberg et al., Can. J of Chem. Eng., vol. 454–1967, Interphase Mass Transfer in Binary Liquid System.

*Primary Examiner*—Michael Marcus
*Attorney, Agent, or Firm*—Keil & Witherspoon

[57] ABSTRACT

A liquid-liquid contactor comprised of a jet of fluid 1 flowing through a coaxial, cocurrently flowing stream of fluid 2 (fluid 1 and fluid 2 being immiscible), with one or both of the fluids being continuously recycled. This device is used as a scientific instrument to measure the rate of interphase transfer of material dissolved in or comprising one of the fluids. The device can also be employed to acquire data on chemical reactions occurring at the interface between the two fluids, in a film adjacent to the interface, or throughout the volume of one or both of the fluids.

7 Claims, 2 Drawing Figures

LIQUID JET RECYCLE REACTOR

BACKGROUND OF THE INVENTION

Mass transfer between two immiscible liquids is the basis for the chemical engineering unit operation of extraction. It is also fundamental in understanding chemical reactions involving two distinct liquid phases. Due to the importance of this process, a variety of methods have been developed to study liquid-liquid mass transfer under laboratory conditions. Lewis cell contactors (essentially a horizontal liquid-liquid interface with rotating distributor rings on both sides of the interface) have been extensively used to study turbulent mass transfer. Applications to systems involving significant diffusional resistance to interphase mass transfer or involving interfacial reaction is limited by the complexity of the hydrodynamics and the accumulation of surface active impurities during reaction. Dispersed phase studies in which the two phases are mixed together are not suitable for fundamental investigations due to the inability to accurately determine the interfacial area and the mixing frequency of the dispersed phase. Use of a drop of one fluid moving or growing in the second fluid has met with some success but the technique has significant limitations because of end effects, excessive contact time, and the coupling of the hydrodynamics to the interfacial properties.

The liquid jet technique has been used extensively to study the interphase transfer of gases and liquids. Although variations have been used the usual method involves passing a jet through a stationary volume of gas or liquid and analyzing samples of the jet fluid (fluid 1). The liquid jet technique is an attractive means of contacting two liquids since it (1) has a constant and measurable area for mass transfer; (2) the hydrodynamics can be approximated to yield good results; (3) the presence of any substantial amounts of surface active impurities can be detected visually through their effect on jet diameter; and (4) the contact time is short allowing enhanced sensitivity to resistances caused by interfacial processes such as interfacial reactions.

PRIOR ART

Liquid-liquid jets of several configurations have been used by various scientific investigators to measure the rate of mass transfer between immiscible liquids and to investigate the process of dynamic interfacial tension. No patents are known to exist for any of these devices and it is assumed that they are in the public domain. A brief summary of published experimental work involving liquid-liquid jets is given below:

Addison and Elliot "The Properties of Freshly Formed Surfaces, Part XV. The Application of the Contracting Liquid-Jet Technique to the Measurement of Tensions at Liquid-Liquid Interfaces," J. Chem. Soc., 3090 (1950) used a liquid jet flowing into a stagnant pool of a second liquid to measure interfacial tension as a function of time.

Quinn and Jeannin "Interfacial Resistance: Diffusion into a Laminar Liquid-Liquid Jet", Chem. Eng. Sci., 15, 243 (1961) used a jet of water flowing through a stagnant pool of isobutanol to measure the rate of mass transfer into the jet. The jet fluid only was analyzed. Ward and Quinn "Diffusion through the Liquid-Liquid Interface," A.I.Ch. E.J., 10(2), 155 (1964) and "Diffusion through the Liquid-Liquid Interface," A.I.Ch.E.J., 11, 1005 (1965) used an aqueous jet over which a thin film of a second immiscible fluid was spread as it passed through a two phase nozzle. The extraction of pure solvents and the transfer of various solutes were measured by analyzing either the jet phase or the organic phase after it had contacted the jet.

Kimura and Miyauchi "Mass Transfer in a Liquid-Liquid Laminar Jet," Chem. Eng. Sci., 21, 1057 (1966) measured the rate of mass transfer of a solute to a jet of organic fluid rising in a container of aqueous solution. Although the diagram given in this publication indicates the possibility of co-current flow, no mention was made of outer fluid flow conditions or effects. It is assumed that the co-current flow provisions were used merely to fill the container at the start of the run.

Fosberg and Heidiger "Interphase Mass Transfer in Binary Liquid Systems—Laminar Liquid Jets, " Can. J. Chem. Eng., 45, 82 (1967) conducted experiments using an apparatus very similar to that used by Quinn and Jeannin.

England and Berg "Transfer of Surface Active Agents across a Liquid-Liquid Interface," A.I.Ch.E. J., 17 (2), 313 (1971) also used an aqueous jet entering a stagnant pool of organic liquid. They obtained dynamic interfacial tension data for the transfer of two solutes.

Hanson and Ismail "Diffusion of Benzene and Toluene into Aqueous Nitric Acid-Sulphuric Acid Mixtures," J. Appl. Chem. Biotechnol. 26, 111 (1976) used a liquid-liquid jet to measure the diffusion coefficients of toluene in various acid solutions. Their configuration provided co-current but not co-axial flow and no mention was made of outer fluid flow conditions or effects.

Hansen and Ismail "Macrokinetics of Toluene and Benzene Nitration under Laminar Conditions," Chem. Eng. Sci., 32, 775 (1977) used a liquid jet apparatus to study the nitration of toluene but analyzed the jet fluid without recycle and were unable to draw any firm conclusions from their results.

SUMMARY OF THE INVENTION

Briefly, in the liquid-liquid jet contactor process and apparatus according to the invention a jet of fluid 1 is arranged to flow through a coaxial, co-currently flowing stream of fluid 2, both of which fluids are immiscible or partially miscible; and, preferably, one or both of the fluids are continuously recycled.

This technique retains all of the advantages (1) to (4) listed above and it overcomes the following disadvantages of the prior art;

(a) Unstable flow patterns in which the position of the jet surface fluctuates in a helical or axisymmetric manner is encountered for some systems under some flow conditions. These disturbances prevent accurate evaluation of the surface area and introduce secondary flows very near the interface which may significantly alter the diffusional resistance. The technique described here can eliminate these instabilities for certain systems.

(b) The small change in chemical composition usually occurring for short contact times may present a serious obstacle to accurate measurement of transfer to or from a fluid making a single pass through the reactor. The recycling of fluid allows significantly greater amounts to accumulate.

(c) "Dead volume" and non uniform concentrations in the outer fluid (fluid 2) can occur in a stationary pool if the only agitation is that supplied by the action of the jet. This non-uniformity can represent a significant departure from the usual mathematical models used in evaluating the data obtained. The flow through nature of the outer fluid flow in the technique described here provides control of and enhancement of the homogeneity of fluid 2.

(d) The "dead volumes" and non-uniform concentration of the outer fluid can introduce significant uncertainties to samples and/or measurements of the outer fluid. The enhanced homogeneity of fluid 2 reduces this problem.

BRIEF DESCRIPTION OF THE DRAWINGS

An embodiment of the invention in a form suitable for use with fluid 1 heavier than fluid 2 is shown in the accompanying drawings, in which.

DESCRIPTION OF THE EMBODIMENT

Figure 1:
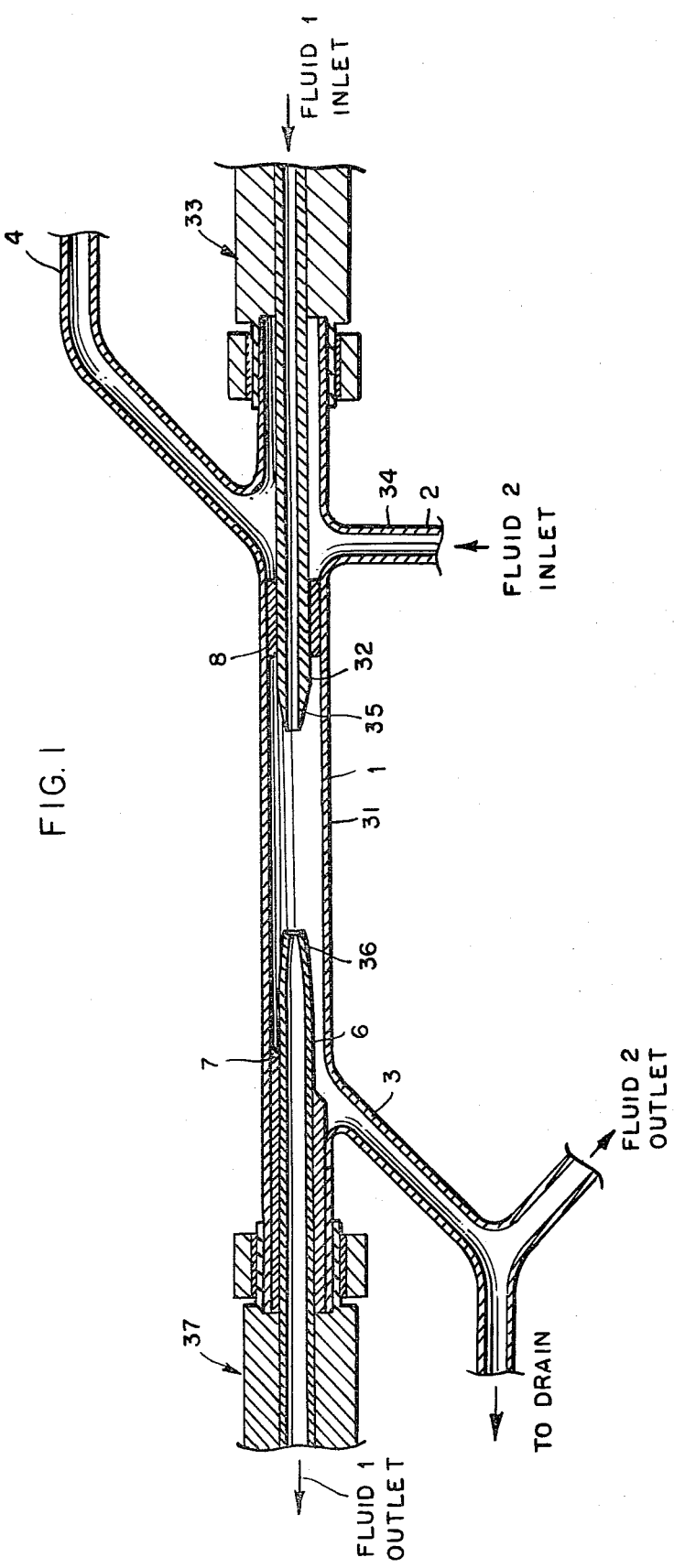
FIG. 1 is a detailed cross-sectional view of the jet chamber.

The liquid jet recycle reactor is a device for contacting two immiscible or partially miscible fluids in such a way that the rate of interfacial transport of various solutes which may be present can be measured. The device operates by creating and maintaining an axisymmetric jet of one phase (fluid 1) which travels for a certain distance through a coaxially positioned co-currently flowing stream of the second phase (fluid 2). The reactor is formed by a tubular vessel 31 in which a tubular nozzle member 32 is axially adjustably mounted by means of a plug assembly 33, for example of Teflon, which fits over the right end of nozzle 32 as viewed in FIG. 1. Fluid 1 enters nozzle 32 at the right end and fluid 2 enters tubular vessel 31 concentrically surrounding nozzle 32, at an entrance port 34. Fluid 2 is passing through tubular vessel 31 coaxially with, and about, the jet of fluid 1 which is produced by nozzle 32. A flow director 8, preferably of Teflon, is situated in the tubular vessel 31 downstream of inlet port 34 between the vessel and the lefthand portion, FIG. 1, of nozzle 32. It serves to eliminate any swirling action which might otherwise occur.

After exiting the vessel at or near the left end (FIG. 1), either or both of the fluids may be recycled. For fluid 1 more dense than fluid 2, tubular vessel 31 is mounted in an axially vertical position with the flow directed downward, allowing gravity to aid in the passage of fluid 1 through fluid 2; for fluid 2 more dense than fluid 1, tubular vessel 31 is vertically mounted with the flow directed upward in consideration of the buoyancy of fluid 1. FIG. 1 is a sketch of the reactor vessel designed for use with fluid 1 heavier than fluid 2. The reactor vessel is made of glass or some other transparent material to allow the jet to be measured photographically. 3 is the outlet port for fluid 2. 4 is a vent tube which allows air to escape when the vessel is being filled. The nozzle 32 illustrated here is of constant bore and produces a jet with a well defined velocity profile upstream of the nozzle. The nozzle is positioned coaxially with the reactor vessel, with the tip 35 of the nozzle positioned below the inlet port.

6 is the receiver tube which consists of a tube with its end 36 tapered and countersunk. It is positioned coaxially with the reactor vessel 31 and the nozzle 32 with the tip above, that is, in FIG. 1 to the right of the outlet port 3. Receiver tube 6 is axially adjustably mounted in a plug assembly 37 which is similar to assembly 33 and fits over the left ends, FIG. 1, of both the receiver tube and the reactor vessel. 7 is a spacer. The receiver tube should be made of a transparent material so that any entrainment of fluid 2 into fluid 1 can be immediately observed. Improved operating and start-up characteristics can be obtained if the outer surface of the receiver tube is more readily wet by fluid 2 than by fluid 1, and if the countersunk portion at the tip 36 is wet more readily by fluid 1 than by fluid 2. For organic/aqueous systems, this can be accomplished by treating a glass receiver tube to make its surface hydrophobic and then grinding a fresh ground glass surface on the countersunk portion.

For fluid 2 heavier than fluid 1 the portion of the apparatus illustrated in FIG. 1 i.e., the reactor vessel, nozzle, receiver tube and associated parts are mounted in an inverted manner with respect to the position just described. Vent tube 4 must then be removed or sealed off. Elimination of air during the filling operation takes place through the drain valve.

The length of the jet can be varied, within limits, by changing the distance between the inner ends of the nozzle and the receiver tube. The jet must be long enough to present a significant interfacial area and to allow for some accumulation of surface active impurities but not so long that the jet breaks up into droplets due to Rayleigh instabilities.

Figure 2:
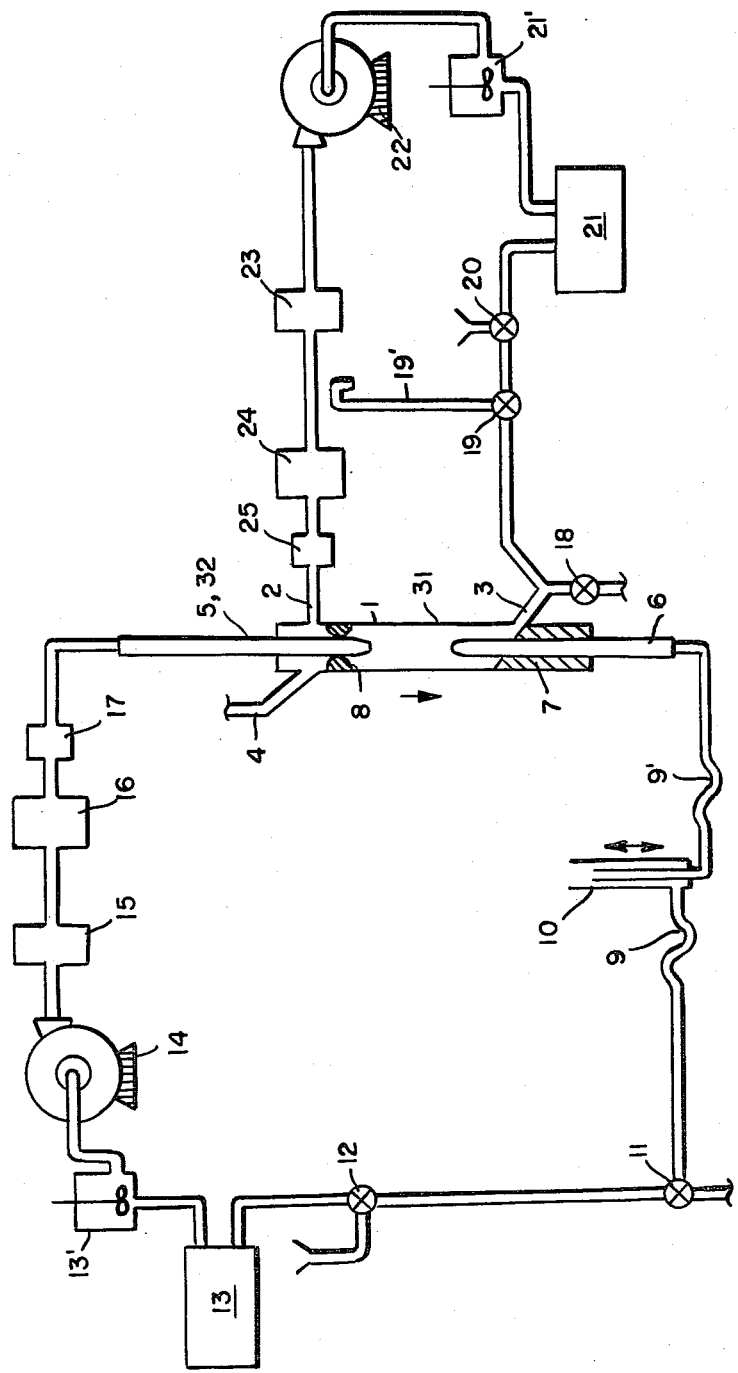
FIG. 2 is a schematic diagram of the entire apparatus and ancillary equipment, including the jet chamber and the recycling loops.

FIG. 2 is a schematic diagram of the entire apparatus. The recycle loops of fluid 1 and fluid 2 are readily apparent from the drawing. Fluid 1 leaves the jet chamber through the receiver tube and goes to the back pressure regulating device, shown here as a variable head hydrostatic tube 10 connected by flexible couplings 9,9'. Any device which will provide the necessary sensitivity (such as a precision metering valve) could be employed. The back pressure must be precisely controlled so that fluid 1 enters the interior of the receiver tube 6 and fluid 2 flows outside, effecting phase separation. Fluid 1 is then carried to a directing valve 11 where any fluid 2 which might have become entrained can be removed. The path then goes to 12, a valve through which fluid 1 may be introduced into the system. 13 is the fluid 1 sampling or monitoring device. If samples are physically removed from the flow system, provisions must be made to maintain the pressure of the system at the point of withdrawal. This can be accomplished by allowing that portion of the path to have a free surface, subject to atmospheric pressure. 13' is a stirred accumulator vessel. It is equipped with a mechanical stirring device of sufficient power and mixing capacity to insure that the contents are well mixed. The entire vessel may be sealed to maintain the system pressure. The vessel is equipped with a means for determining the volume of liquid contained at any time (such as a sight glass or graduations). 14 is a variable speed, non-pulsating flow pump, which provides the impetus for the circulation of fluid 1. It must be of adequate size to allow for jet flow to develop from the nozzle. 15 is a flow measuring device such as a rotameter. 16 is a heat exchanger to assure that fluid 1 is maintained at the desired temperature and 17 is a temperature monitoring device such as a thermometer.

Fluid 2 leaves the reactor vessel 31 through the outlet port 3 and passes by the drain 18. The drain is located at a low point in the fluid path immediately following the outlet port 3. Any droplets of fluid 1 which might overflow the receiver during the start-up and filling operation will accumulate here and can be drained off. Valves 19 and 20 are used to fill the vessel initially. The overflow 19' on valve 19 must be sufficiently high so that fluid 2 will accumulate in the vessel 31. 21 is the measuring device such as a flow through spectrophotometer or a sampling port. Again, if samples are withdrawn, the pressure at the point of withdrawal must be maintained. 21' is a stirred accumulator vessel possessing the same qualities as item 13'. 22 is the circulating pump for fluid 2. It is of variable speed, nonpulsating flow. It must be of sufficient capacity so that for the diameter of the reactor vessel 31 chosen, and the overall flux of material across the jet interface, the change in concentration of fluid 2 as it passes through the reactor is small. Fluid 2 then passes through a flow measuring device 23, heat exchanger 24 and a temperature monitoring device 25 before returning to the inlet port 2.

The process and apparatus according to the invention permit the following applications among others: The liquid jet recycle reactor technique of the invention can be used to provide data on the liquid diffusion coefficient of the transferring species in either phase.

It can also be employed to obtain reaction rate data for liquid-liquid reactions occuring at the liquid-liquid interface, in a film adjacent to that interface or throughout the entire volume of one or both fluids in a homogeneous manner, such as, but not limited to 3:

(a) a reaction between aqueous metal ions and an organic phase chelating agent or an organic acid such as alkyl carboxylic or phosphoric acid (b) a solvation reaction of neutral aqueous complexes such as uranyl nitrate with organic solvents such as tributyl phosphate (c) a phase transfer catalytic reaction such as alkylation of carbanions and the addition of chloroform to double bonds (d) hydrolysis of esters such as ethyl acetate and butyl formate (e) a nitration reaction such as nitration of toluene or benzene (f) a bromination reaction such as the bromination of benzene by hypobromous acid (g) a desulfurization of organic compounds (h) an alkylation of olefins such as butene (i) a reduction of aqueous metalic ions such as Ce(IV) by an organic agent such as tetrachlorohydroquinone.

The technique can further be used to obtain data on the efficacy of a given solvent to remove trace quantities of chemicals or pollutants from an aqueous solution (obtained from industrial effluents).

The data provided by the liquid jet recycle reactor consists of the measured concentration in one or both loops as a function of time. This can be related to the total rate of interphase mass transfer by the differential material balance $$\left[\begin{array}{c}\text{volume of fluid in}\\ \text{the loop}\end{array}\right] \frac{dc}{dt} = \text{total rate of interphase}$$

transfer where $dc/dt$ is the rate of change concentration of the transferring species being monitored. The total rate of mass transfer is thus available for analysis using an appropriate mathematical model derived from the theory of mass transfer to provide experimentally determined values of various parameters such as diffusion constants, rates of reaction at the interface, rates of reaction in a thin film adjacent to the interface or occurring throughout the bulk of the fluid.

An appropriate model for interfacial reaction with negligible diffusional resistances might be (interfacial area) (interfacial reaction rate) = total rate of interphase transfer where the interfacial area is determined by photographic means. Analysis involving interfacial reaction with appreciable diffusional resistance is quite complex and requires application of the basic theories of mass transfer and chemical kinetics such as the penetration theory or film theory. Mathematical models for reaction occurring in a thin film adjacent to the interface are available from various texts on mass transfer. The case of reaction occurring throughout the fluid involving a transferring species and a different monitored species in that fluid is simply given by $dc/dt$ = rate of reaction of monitored species in which case the interphase transfer serves only to provide or remove species involved in a controllable manner to facilitate an accurate analysis of the rate of reaction.

Some of the advantages afforded by the invention are:

The co-current coaxial flow of the outer fluid (fluid 2), if of sufficient average velocity as achieved by adjusting the volumetric flow rate and specifying a sufficiently small internal diameter of the reactor vessel, reduces, delays, or eliminates the axisymmetric and non-axisymmetric disturbances which occur for some combinations of fluids at certain fluid flows.

The continuous return of fluid 2 and/or fluid 1 to the reactor vessel after passing it through the reactor vessel can;

(a) permit the accumulation of larger, and thus more accurately measured, quantities of the transferring species, (b) permit the effect of the reverse portion of a reversible reaction or extraction to be studied as the products of the forward reaction or extraction (which are identically the reactants of the reverse reaction) accumulate to a significant degree, (c) if the volume of fluid 2 and/or fluid 1 contained in the reactor vessel and the flows of fluids 1 and 2 have been adjusted so that the change in concentration of a species during the passage of the fluid through the reactor vessel is small compared to concentration of that species, contact the entire volume of the two fluids as homogeneous units (exclusive of any concentration gradients which will occur due to the mass flux or nonideal flow patterns) through an interface of accurately measurable dimensions (photogrammetry can be employed to measure the jet dimensions), which is freshly formed at each instant (and thus free of any impurities for the whole or part of its area).

(d) if the volumes of fluid 2 and/or fluid 1 contained in the reactor vessel and the flows of the fluids are adjusted so that the change in concentration of a species is small during the passage of the fluid through the vessel is small, provide a sample to be removed from the system for chemical analysis (such as gas chromatography, atomic absorption) or a stream to be analyzed by flow through measuring device (such as an ultra violet-visible light spectrophotometer provided with a flow cell) which is truly representative of the bulk fluid phase in contact with the opposing phase.

The liquid jet recycle reactor being equipped with suitable valves and flow measuring devices, can vary in a predictable way, the amount of time a fluid element of fluid 1 remains in contact with fluid 2 (contact time) before it exits the reactor, this being a useful way to vary the relative effects of diffusional resistance and the resistance caused by interfacial reaction.

The liquid jet recycle reactor, being equipped with a back pressure regulating device located in the path of fluid 1 immediately after the reaction vessel (such a device can be a simple valve or a variable head hydrostatic column), can provide a means for removing any surface active contaminants which might occur and which, if present will accumulate on the interface at the end of the jet nearest the receiver, by slightly under balancing the jet (reducing the back pressure slightly) and allowing a small drop of the outer fluid to become entrained in the jet fluid, since the contaminants gathered at the bottom of the jet become entrapped on the entrained drop.

The liquid jet recycle reactor, being equipped with a suitable accumulator vessel in one or both of the fluid paths, can be operated using an adjustable total volume of fluid 1 or fluid 2, so that the rate of change of concentration can be adjusted to an accurately measurable range.

The accumulator, being equipped with a stirring device will allow the additional fluid volume contained in the accumulator to be employed without adding to the time required for the oscillations in concentration produced by the start up operation to subside.

The liquid jet recycle reactor, since it does not involve dispersing one liquid in the other (except possibly during start up) can provide mass transfer with no entrainment of one fluid into the other. This can be of advantage in separations involving costly or toxic solvents.

We claim:

1. A liquid-liquid jet reactor apparatus in which, for the investigation of interphase phenomena two immiscible or partially miscible liquids, one being represented by an aqueous phase and the other by an organic phase, are brought into mutual contact, said reactor apparatus comprising:
   a nozzle means for producing a vertical jet of the first liquid,
   a receiver means longitudinally spaced from and axially aligned with said nozzle means for collecting said jet, said receiver means having an inner surface and an outer surface,
   a tubular vessel coaxial with said nozzle means and said receiver means,
   the inner wall of said tubular vessel being radially spaced from said nozzle means and said receiver means so that said tubular vessel closely surrounds said nozzle means and said receiver means in sleevelike fashion, and said tubular vessel extending both upstream of the inner end of said nozzle means and downstream of the inner end of said receiver means so as to define a narrow annular gap between said nozzle means, said liquid jet and said receiver means on the one hand and said tubular vessel on the other hand,
   feed means opening into said narrow annular gap upstream of the inner end of said nozzle means for admitting the second liquid into said annular gap so as to produce, in operation, a separate steady stream of the second liquid which is confined to said annular gap and flows coaxially and cocurrently about, and in contiguity with, said jet throughout the length thereof,
   outlet means located downstream of the inner end of said receiver means for removing the second liquid from the corresponding portion of the annular gap, and baffle means between said nozzle means and said vessel for directing the stream of said second liquid, one of said surfaces of said receiver means, which serves to conduct said organic phase, having a coating of hydrophobic material deposited thereon so as to be less readily wetted by said aqueous phase than by said organic phase thereby to facilitate separation of said two streams.

2. A liquid-liquid jet apparatus for the investigation of interphase phenomena and comprising a means defining a reactor chamber in which two immiscible or partially miscible liquids, one being represented by an aqueous phase and the other by an organic phase, are brought into mutual contact, said means including a tubular vessel, nozzle means coaxially disposed within said vessel for producing a central jet stream of the first liquid, receiver means also coaxially disposed within said vessel for collecting said central jet stream, said receiver means having an inner surface and an outer surface, said tubular vessel having inlet means for producing a stream of the second liquid flowing coaxially and cocurrently about said central jet stream and outlet means for collecting said stream of the second liquid separately from said central jet stream, said inlet means and said outlet means being provided upstream of the inner end of said nozzle means and downstream of the inner end of said receiver means, respectively, baffle means being provided between said nozzle means and said vessel for directing the stream of said second liquid, and that one of said surfaces of said receiver means, which serves to conduct said organic phase, having a coating of hydrophobic material deposited thereon so as to be less readily wetted by said aqueous phase than by said organic phase, thereby to facilitate separation of said two streams, and said apparatus also comprising means defining two separate loop paths the first loop path being connected at one end to said receiver means and at the other end to said nozzle means, and the second loop path being connected at one end to said outlet means and at the other end to said inlet means and each said loop path including pump means for recycling, and at least the second loop path having means for analyzing the respective liquid flowing through said chamber.

3. A jet apparatus as claimed in claim 2, in which, with said first liquid denser than said second liquid, the means defining said reactor chamber is mounted with said two streams oriented vertically downwardly.

4. A jet apparatus as claimed in claim 2, in which, with said second liquid denser than said first liquid, the means defining said reactor chamber is mounted with said two streams oriented vertically upwardly.

5. A jet apparatus as claimed in claim 2, in which said first liquid is represented by the aqueous phase and the second liquid by the organic phase, the means defining the loop path for said aqueous phase being connected to reintroduce aqueous phase discharged from said receiver means into said nozzle means, and the means defining the loop path for said organic phase being connected to reintroduce organic phase discharged from said outlet means into said inlet means.

6. A jet apparatus as claimed in claim 5, in which said loop path for the aqueous phase includes a back pressure regulating device to facilitate effective phase separation at the receiver in said chamber.

7. A jet apparatus as claimed in claim 5, in which said loop path for the organic phase includes a variable speed, non-pulsating flow pump, said pump being of sufficient capacity so that for the chosen diameter of the reactor chamber, and the overall flux of material across the jet interface, the change in concentration of organic phase as it passes through said chamber is small.

* * * * *